3,833,737
TREATMENT OF GRAIN WITH YEAST AND FLOUR PRODUCED FROM SAID GRAIN
Jack Siegel, 10970 Palms Blvd., Los Angeles, Calif. 90034
No Drawing. Filed Nov. 6, 1972, Ser. No. 304,116
Int. Cl. A21d 8/02; A23l 1/10
U.S. Cl. 426—18                      7 Claims

ABSTRACT OF THE DISCLOSURE

Cereal grains, such as wheat, rye, and the like, are contacted with a mixture of water and yeast for a time sufficient for said grains to imbibe a substantial quantity of said water. The grains are then milled into flour, either with or without a preliminary washing and/or a preliminary drying.

---

This invention relates to the treatment of grain to improve the properties of flour made therefrom, with especial reference to the baking industry.

A difficulty in the conventional process of making bread is that in order to produce a loaf of bread of satisfactory flavor and texture, it is necessary to commence operations on at least part of the dough several hours prior to baking time. During this prolonged period, fermentation occurs which contributes to the leavening action on the final loaf, adds flavor, and improves the texture of the bread produced. Various attempts have been made to shorten or to eliminate substantially altogether this hold period, but such proposed solutions have not been satisfactory, and many of them are additionally undesirable because they involve the use of various chemicals, which in the present consumer climate is a practical disadvantage. Accordingly, most bread is made by a process which is almost as prolonged as was conventional hundreds of years ago.

The object of the present invention is to provide a method for treating grain so that the flour made therefrom can be used in the breadmaking art with little or no waiting time between the initial preparation of the dough and the baking of the bread.

Another object of the invention is to provide a process for the treatment of grain to provide a flour which has improved properties in non-yeast baking such as cookies, cakes, and crackers.

Other objects of the invention will appear as the description thereof proceeds.

Generally speaking, and in accordance with illustrative embodiments of my invention, I take the grain to be treated, which is preferably in the form of the whole grain but may include some cracked or broken kernels and which may be any of the grains commonly used in baking, such as wheat primarily, but also such other cereal grains as rye, millet, barley, rice, maize, and the like, and submerge the grain in water containing a modicum of yeast. The yeast is ordinary bakers' or brewers' yeast, viz., Saccharomyces species, more particularly S. cerevisiae, or S. cerevisiae var. ellipsoidales.

The mixture of grain, water, and yeast is then allowed to stand for a period of time sufficient for the modification of the grain in accordance with the invention to take place. This period of time is a function primarily of the temperature of the mixture and of the ratio of yeast to grain which has been employed. To some extent it is also a function of the type of grain itself, since cereal grains other than wheat may require a somewhat different time. In any case, for any given set of conditions, a simple pilot test will enable the operator to determine a suitable period of time for treatment. This point will be discussed in more detail hereinbelow.

During the course of the treatment with the water and yeast, the grain swells, and may take up anywhere from 10 parts to 100 parts of water per 100 parts per weight of air-dry grain. In general, a minimum treatment in accordance with the invention results in the grain such as wheat being in contact with the water long enough to take up about 20 parts of water per 100 parts of air-dry wheat grains in the presence of about 0.05% by weight of yeast, that is, about one ounce of yeast per 100 pounds of grain before treatment. A preferred treatment, however, consists of prolonging the contact time sufficient for the grain to take up generally from 20 to 80% of its original weight of water. More particularly, I may use as little as one ounce of yeast per 100 pounds of grain, in which case the treatment should continue for from about two to three days; and I may use as much as one pound of yeast per 100 pounds of grain, in which case the treatment is complete in as little as two or three hours. Larger amounts of yeast may of course be used, but in general are wasteful, although excess yeast does no harm. The times and quantities just given are for treatment at a temperature in the range of about 80° F. to about 110° F. Higher temperatures, up to about 140° F. may be used, with some shortening of time, except that the yeast is damaged by temperatures in excess of about 140° F. Temperatures lower than about 80° F. may be used, but the treatment times become unduly prolonged. In some cases, however, the prolongation of treatment time may be more economical than maintaining an elevated temperature so that the inventive process may be operated at as low as 60° F.

The treatment may be carried out in ordinary vessels such as cylindrical stainless steel containers open at the top. However, I prefer to charge the mixture of grain, water and yeast into a closed vessel so that it may be inverted from time to time so as to insure uniform treatment of all of the grains, keeping in mind the fact that gravity tends toward the production of moister grains at the bottom of the container. The shape of the container is, however, quite uncritical, and my inventive treatment is readily adapted to being carried out in a continuous fashion, in which the mixture of grain, water and yeast is carried along in a moving horizontal trough; or propelled in a trough by a screw conveyor; or tumbled through a long tubular conveyor of the conventional type carrying helical flights on the inside and in which movement of the grain is effected by rotating the tube.

The treatment time may be shortened to some extent by placing the mixture of grain, water, and yeast in a vessel which is not only closed but which will withstand a certain amount of pressure, for example from about 5 to 10 pounds per square inch gage. The evolution of carbon dioxide during the treatment may conveniently furnish the desired pressure, a pressure relief valve being of course employed to limit the buildup of pressure to a safe value.

After the yeast and water have been allowed to remain in contact with the grain for a suitable period of time, any excess water is drained off and the grain is essentially ready for use, although in general, I prefer to carry out some aftertreatments. The first aftertreatment consists of washing the treated grain with water so as to remove a portion or substantially all of the yeast. This is by no means necessary, and is a purely optional treatment. The second optional aftertreatment is to dry the treated grain whether or not it has been washed as just described. Any suitable drying apparatus may be used, and a variety can be employed, such as tray driers, rotating kilns, and the like. If the grain is dried to a residual moisture content of say 10% to 20% weight, then it may be kept indefinitely, until milling is carried out. I prefer to dry the grain as described, since this gives great flexibility in the entire chain of operations from treatment in accordance with the invention to milling into flour and eventually into using the flour for the production of food products such as bread. It is possible to use the treated grain without drying, but where the moisture content is high, milling is relatively difficult, although this is not necessarily the case for certain specialty breads where the whole grain is used. The treated grain may of course be only partially dried, for example to a moisture content of 25%. However, unless the treated grain is dried to a reasonably low moisture content, such as 20% or less by weight, it should be used promptly to avoid the spoilage to which moist grain is subject.

When the grain has been treated in accordance with the invention and dried, it does not differ substantially in appearance from the grain before treatment, except that the exterior surface of the grain may have lost some of its original gloss. Moreover, if the drying temperature has not been excessively high, such as in excess of about 150° F., then the grain in general will still be capable of germination. My treatment thus apparently does not exert any damaging influence on the germ of the grain. Nevertheless, in spite of these two relatively unchanged aspects of the treated and dried grain, the bulk of the grain, and in particular the portion which contains the starch and the gluten, has apparently been subjected to a profound modification, the biochemical nature of which I am unable to explain at the present time. This modification, which is present in the grain which has been subjected to the inventive process regardless of whether or not it has been washed and/or dried, manifests itself in the behavior of the treated grain after it has been ground into flour and made into food products, most especially into bread.

For baked goods of the type with which yeast is not used, such as cakes, cookies, and baking powder biscuits and the like, where leavening is accomplished with baking powder as distinguished from yeast, the products will have a lighter texture and a richer flavor than similar products made with untreated grain. Indeed, even where no leavening at all is used, as in products such as matzos, tortillas, and cereal chapattis, the flavor will be richer and the products less gummy.

However, the advantages provided by the invention manifest themselves to greatest advantage when the inventively treated grain is made into yeast-raised products such as bread, rolls, sweet rolls and coffee cakes, yeast-raised doughnuts, and the like. Here the outstanding advantage, particularly in the case of bread, is a reduction or a complete elimination of the preliminary fermentation step, together with the added benefit of improved flavor and texture. As is well known, bread is rather generally made at the present time by one of several dough processes, and one of several recently developed batter processes, the latter often termed "continuous" or "balloon" breadmaking. In all of these several processes, a preliminary fermentation is carried out utilizing yeast, all or various portions of the flour to be used, and yeast food and other minor additives. After a variable period of time which is generally several hours, the additional flour, if any, is added, together with other optional ingredients such as sugar, salt, shortening, milk, non-fat milk solids, and the like, and after a final relatively short fermentation time, the dough is formed into loaves and baked.

In the widely used sponge process, about 50% to 70% of the flour and most of the water together with the other ingredients mentioned are mixed and allowed to ferment for about 3 to 5 hours Then the balance of the flour and the other ingredients mentioned are admixed to form the final dough, which is then permitted to rest an additional period of time, generally somewhat less than an hour, after which the dough is formed into loaves and baked. When flour made from grain processed in accordance with the invention is used, the preliminary fermentation step can be eliminated completely, and all of the ingredients made up *ab initio* to form the dough, which is then allowed to ferment for only the final time of somewhat less than an hour, such as 45 minutes, and then formed into loaves and baked. The saving in processing time is thus substantial, and the economic advantages are obvious and indeed of increasing importance as labor costs increase disproportionately with materials costs. Some specific examples will be given later.

It may be noted that the aforementioned advantages of grain treated in accordance with my invention are present regardless of whether the grain is milled to produce a white flour, or whether the milling is of the whole grain or to flour products intermediate between white and whole grain.

My inventive process yields flour which gives equally important advantages in the so-called continuous method of bread production. In this process, the prefermentation is accomplished in a mixture of essentially liquid consistency, containing water, yeast, sugar, and often some flour, although much less flour than is used to make the sponge in the process already described, and often yeast food and/or salt. After a sufficient period of fermentation, the balance of the flour and and additional ingredients are added and the mixture mechanically treated and agitated, and finally extruded in a form permitting continuous cutting into pieces of loaf size. The texture of the bread made by this process is considerably lighter because of the small bubble size, although the flavor is generally considered rather pale Here again, flour made from grain treated in accordance with the present invention is admirably adapted for this process, and the prefermentation step can be reduced or eliminated entirely. In addition, the bread produced has a better flavor, all of which can be accomplished without the use of any artificial flavor additives.

Certain specialty breads are made wiht the employment of a so-called "sour." These include certain pumpernickel and rye breads; "sourdough french bread" made particularly in California; salt rising bread; and the like. All of these as conventionally made require a prefermentation stage of several hours, which can be eliminated or reduced to a fraction of the ordinary time, when using flour made from grain treated by the present invention.

As already mentioned, flour made from the inventively treated grain may also be used to advantage in various types of bakery goods in which yeast is not employed or is employed only as a minor leavening agent in addition to chemical baking powders. In these instances, there may be no particular saving in overall processing time, but the improved flavor and texture of the final product will generally justify the employment of my flour.

The production of the various baked goods mentioned is discussed in considerable detail in standard texts, such as Kirk-Othmer—Encyclopedia of Chemical Technology, Second Edition, New York. Especially useful is the section entitled "Bakery Processes and Leavening Agents" commencing on page 41 of Volume 2 (1964) of this work; and the section entitled "Yeasts" in Volume 22 (1970), particularly pages 528–534, all of which is hereby included by reference herein.

As common in this art, and as used herein, percentages of the various ingredients used in baked goods, including particularly bread, are expressed as percentages of the weight of the flour used, the latter corrected to a 14% moisture basis. Thus, in simple yeast-raised bread, the basic ingredients are generally, for each 100 grams of flour (measured at 14% moisture), from about 50 to 70 grams of water, depending principally upon the type and characteristics of the flour, from 1 to 4 grams, more commonly from 2 to 3 grams, of yeast, and, unless the bread is desired to be salt-free, from about 1 to 3 grams of salt.

A working example showing not only the treatment of grain in accordance with the invention but also its utilization in the breadmaking art will now be given:

225 pounds of dry wheat grains, American winter wheat, in the form as commonly supplied by granaries, were placed in a cylindrical stainless steel tank, 18.0 gallons of water to which six ounces of yeast had been added were poured onto the wheat grains in the tank. The water temperature was approximately 80° F., and the ambient temperature was approximately 75° F. The mixture was allowed to stand for 24 hours, at the end of which time all of the water had been taken up by the grains, and the bed of grain in the tank had increased in height by about 75%. The treated grain was washed with about 30 gallons of water, and then dried overnight at about 140° F.

The treated and dried grain was next milled to produce a white flour, which was then used to make bread. The flour assayed 11.96% protein, 0.454% ash, and 12.20% moisture. The amylograph reading by the test standard in the baking industry was 540; and a standard farinograph showed a mixing peak of 4¾ minutes with an absorption of 63.9%. A bread dough was made using 3% yeast, 0.5% yeast food, 5% sugar, 2.5% non-fat milk solids, and 2.5% shortening. No prefermentation period as in the sponge process was used. The dough was mixed for 17 minutes and allowed to stand for 20 additional minutes, after which it was formed into loaves and baked. The quality of the loaf produced was excellent from the standpoint of flavor and physical characteristics.

In another test, 100 pounds of spring wheat were covered with eight gallons of water to which 2½ ounces of yeast had been added. This was allowed to stand overnight and the increase in bulk volume was approximately as in the previous example. The wheat was washed and dried as already described, and then milled into white flour.

The resulting flour assayed 12.45% protein, 0.409% ash, and 11.60% moisture. The amylograph reading was 590. The farinograph test showed a mixing peak of 5¾ minutes, with an absorption of 62.2%. This flour was employed in a laboratory type continuous breadbaking facility, using 2.5% yeast, 0.5% yeast food, 8% sugar, 2% milk, 3% shortening, and 0.25% monoglycerides. A fermentation time of 2½ hours was used, which was substantially shorter than usual. A good loaf of bread was produced.

As is well known, in the breadmaking art generally, and as illustrated in the foregoing examples, a dough is prepared in which the essential ingredients are water, yeast, and flour. Other non-essential ingredients may be added, such as sugar, yeast food, softeners, salt, and the like. The dough is then allowed to ferment, whereupon the dough is formed into the preselected desired shapes, most generally oblong, and which may be termed loaf precursors. These loaf precursors are then placed in an oven and baked to complete the process of preparing a loaf of baked bread.

While I have described my invention with the aid of numerous specific examples, it will be understood that the invention is a broad one and many variations in detail of procedure, proportions, process conditions, and the like are possible within the broad scope of the invention, as set forth in the claims which follow.

Having described the invention, I claim:

1. A process for the treatment of cereal grain to improve the properties of flour made therefrom which comprises the steps of:
   (a) containing the cereal grains with a mixture of yeast and water at a temperature of from about 60° F. to 140° F. wherein the yeast is present to an extent within the range of from about one ounce to about one pound of yeast to about 100 lbs. of grain; and
   (b) permitting said contact to take place for a time sufficient for said grains to swell with imbibition of the water wherein the imbibition is from 20% to 80% of the original weight of the grains.

2. A process in accordance with claim 1 wherein subsequent to said imbibition, the cereal grains are dried and milled to produce flour.

3. The flour product obtained by the process of claim 2.

4. The process in accordance with Claim 1 wherein sufficient water is used to initially cover said grains.

5. The process in accordance with Claim 1 wherein said cereal is wheat.

6. A process in accordance with Claim 1 wherein subsequent to said imbibition, said cereal grains are washed.

7. The process in accordance with Claim 6 wherein subsequent to said washing, said cereal grains are dried.

References Cited

UNITED STATES PATENTS

| | | | |
|---|---|---|---|
| 1,255,292 | 2/1918 | Chidlow | 426—18 |
| 3,394,008 | 7/1968 | Lodder et al. | 426—19 |
| 1,463,954 | 8/1923 | Hess | 99—90 S |
| 2,555,235 | 5/1951 | Huzenlaub et al. | 99—80 PS |
| 1,387,387 | 8/1921 | Graham | 99—90 S |
| 2,771,365 | 11/1956 | Mininberg | 99—80 R |
| 3,167,432 | 1/1965 | Colby | 99—93 |

RAYMOND N. JONES, Primary Examiner

U.S. Cl. X.R.

426—27, 205